Patented Feb. 13, 1923.

1,445,331

UNITED STATES PATENT OFFICE.

ARTHUR LINZ, OF NEW YORK, N. Y., ASSIGNOR TO THE CHEMICAL FOUNDATION INCORPORATED.

COMPOUND OF MON-AZO DYESTUFFS AND LAKES DERIVABLE THEREFROM.

No Drawing.       Application filed April 1, 1922.  Serial No. 548,769.

*To all whom it may concern:*

Be it known that I, ARTHUR LINZ, a citizen of the United States, and a resident of the borough of Manhattan, city, county, and State of New York, have invented an Improvement in Compounds of Mon-Azo Dyestuffs and Lakes Derivable Therefrom, of which the following is a specification.

My invention relates to the preparation of compounds from mon-azo coloring matters and of lakes derivable therefrom, and has as an object the obtainment of compounds which are more readily soluble than the mon-azo coloring matter, and which yield improved color lakes.

The methods which have been in prior use for the manufacture of lakes from mon-azo coloring matters have consisted in treating the coloring matter either as the free acid or as an acid salt, or as a sodium salt thereof in solution with a calcium or barium precipitant in the presence of a substratum. This method of procedure may possess the disadvantage in many instances of yielding a lake which when printed gives a dull or muddy appearance, or overtone lacking brilliancy, clearness and transparency.

I have ascertained that this disadvantage may be largely obviated, and I have discovered that the mon-azo coloring matters may be converted into soluble alkali bisulphite compounds, and that these compounds are well adapted for the production of color lakes.

Furthermore, it is found that the color lakes which are produced through the use of the new alkali bisulphite compounds of the mon-azo coloring matters, are of a better quality than the color lakes produced directly from the mon-azo dyestuff through the employment of a precipitating agent. The lakes from the bisulphite compounds appear to be of greater brilliance, a cleaner tone, more transparent, and to be without a muddy appearance or overtone when used in the preparation of prints, e. g., red for lake D prepared by condensation of anthranilic acid with beta naphthol and having the formula

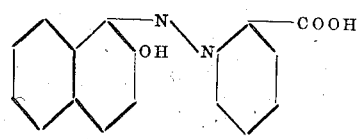

may be converted into a bisulphite compound which is readily soluble and which when converted into a lake yields a lake possessing the improved characteristics hereinbefore mentioned.

I have learned that the conversion of mon-azo coloring matters into alkali bisulphite compounds may be accomplished by treating the mon-azo coloring matter in solution with an alkali bisulphite whilst stirring and heating the mixture to a temperature slightly below the boiling point thereof. The alkali bisulphite compound thus produced may either be directly, that is, without removing the same from the medium in which it is formed, transformed into a color lake, or it may be separated from the preparation medium and subsequently placed in solution and converted into a lake. It is rather preferred to separate or precipitate the alkali bisulphite compound, and this may be satisfactorily done by salting out with a suitable salting agent such as, for example, sodium chloride. The alkali bisulphite compound, either directly or after having been placed in solution, may be transformed into a lake either with or without a substratum by adding thereto a suitable precipitating agent, such as compounds of alkaline earth metals, of zinc, of tin, of lead, and of aluminium separately and in combinations thereof, together with an alkali or a salt having, when in solution, an alkaline reaction, and of sufficient alkaline strength to split off the bisulphite residue, thus yielding a coloring lake of the mon-azo coloring matter, which lake possesses the more satisfactory characteristics.

As an illustrative embodiment of a manner in which my invention may be carried into practical effect, the following example is presented:

*Examples.*

(*a*) Treat 100 parts of the sodium salt of the mon-azo coloring matter or an equivalent amount of the free acid, such as for example, red for lake D, with 200 parts of sodium bisulphite in the presence of 8300 parts of water, stir constantly and maintain the temperature at from 90° to 100° C. When a clear solution is obtained the bisulphite compound may be precipitated by means of common salt.

(*b*) Dissolve 10 parts of the sodium bisulphite compound produced according to *a* in about 300 to 500 parts of water. Stir in 10 parts of barium chloride crystals previously dissolved in 100 parts of water and then add 50 parts of "gloss white," that is a mixture of aluminium hydrate, 13% paste and of blanc fixe, 70% paste, previously converted into a thin paste, by adding 80 parts of water. Then add very slowly and with constant stirring, 5 parts of 28% aqueous ammonia diluted with 45 parts of water. After the ammonia has been added, the stirring is continued until the reaction is complete.

The alkali added last serves to convert the bisulphite compound into the coloring matter which is then converted into the barium salt, through reaction with the barium chloride present. There is thus produced a color lake from which the muddy appearance or overtone usually present in red for lake D lakes prepared by ordinary methods, has been eliminated. Furthermore, the lake is somewhat more brilliant, more transparent and slightly bluer in shade.

While the foregoing example sets forth a practical application of the invention particularly with reference to red for lake D, nevertheless it will of course be understood that the invention is not limited to this particular dyestuff, but that it may be applied to the class of dyestuffs known as the mon-azo dyestuffs within which class there may be more particularly mentioned the following: Helio red, helio orange, helio Bordeaux, helio purpurin, lithol Bordeaux, lithol scarlets, lithol rubines, permanent reds, permanent oranges, lake Bordeaux B, lake red C, lake red P, hansa rubine, pigment reds, pigment oranges, pigment scarlets, pigment rubines, xylidine scarlets.

The alkali bisulphite compounds of the mon-azo coloring matters are extremely soluble in water and under the influence of alkalis and other suitable compounds they readily revert back to the coloring matter itself, or to a salt thereof. In addition these compounds differ in color from the dyestuffs used which change may for instance be exemplified by the oranges and reds, from which bisulphite compounds ranging in color from a primrose yellow to a light orange, both in solution and in powder form, are obtained. This characteristic of the alkali bisulphite compounds being of a different color or of a much lighter shade of the same color, is demonstrated not only by the oranges and reds, but by all others of the mon-azo series.

I claim:

1. A process for the preparation of lakes from mon-azo coloring matters which comprises converting the coloring matter into an alkali bisulphite compound and treating a solution of said alkali bisulphite compound with "gloss white" together with a precipitating agent and an alkali.

2. A process for the preparation of lakes from mon-azo coloring matters which comprises converting the coloring matter into an alkali bisulphite compound and treating a solution of said alkali bisulphite compound with "gloss white" together with barium chloride and an alkali.

3. A process for the preparation of lakes from mon-azo coloring matters which comprises converting the coloring matter into an alkali bisulphite compound and treating a solution of said alkali bisulphite compound with "gloss white" together with barium chloride, and ammonium hydroxide.

4. A process for the preparation of lakes from mon-azo coloring matters which comprises treating the coloring matter in aqueous solution with sodium bisulphite at a temperature of about 90° to 100° C., precipitating the alkali bisulphite compound formed with sodium chloride, dissolving said alkali bisulphite compound in water, and to the solution so obtained adding "gloss white", a precipitating agent, and an alkali.

5. A process for the preparation of lakes from mon-azo coloring matters which comprises treating the coloring matter in aqueous solution with sodium bisulphite at a temperature of about 90° to 100° C., precipitating the alkali bisulphite compound formed with sodium chloride, dissolving said alkali bisulphite compound in water, and to the solution so obtained adding "gloss white", barium chloride and ammonium hydroxide.

6. As a new compound, the alkali bisulphite compound of red for lake D, obtained by condensing anthranilic acid and beta naphthol and having the formula

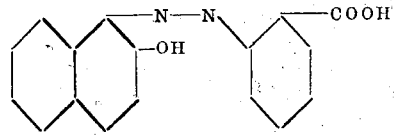

which alkali bisulphite compound is a yellow powder extremely soluble in water yielding a yellow solution, reverts back to a salt of the coloring matter upon addition of an alkali, and which may be produced by treating red for lake D with an alkali bisulphite in solution at a temperature of 90° C., and then precipitating with sodium chloride.

In testimony whereof, I have signed my name to this specification this 31st day of March, 1922.

ARTHUR LINZ.